United States Patent
Deng et al.

(10) Patent No.: US 6,838,979 B2
(45) Date of Patent: Jan. 4, 2005

(54) VEHICLE-TRAILER BACKING UP JACKKNIFE DETECTION AND WARNING SYSTEM

(75) Inventors: Weiwen Deng, Rochester Hills, MI (US); Yong H. Lee, Troy, MI (US); Yuen-Kwok Chin, Troy, MI (US)

(73) Assignee: General Motors Corporation, Detroit, MI (US)

( * ) Notice: Subject to any disclaimer, the term of this patent is extended or adjusted under 35 U.S.C. 154(b) by 70 days.

(21) Appl. No.: 10/435,209

(22) Filed: May 9, 2003

(65) Prior Publication Data

US 2004/0222881 A1 Nov. 11, 2004

(51) Int. Cl.[7] .............................................. G08B 21/00
(52) U.S. Cl. ...................... 340/431; 340/465; 340/440; 701/72
(58) Field of Search ................................ 340/431, 440, 340/463, 465, 438, 471, 933, 936; 701/72

(56) References Cited

U.S. PATENT DOCUMENTS

| 4,700,966 A | * | 10/1987 | Hawkins et al. ............ 280/432 |
| 5,579,228 A | * | 11/1996 | Kimbrough et al. .......... 701/41 |
| 5,912,616 A | | 6/1999 | Valentino |
| 6,042,196 A | * | 3/2000 | Nakamura et al. ............. 303/7 |
| 6,268,800 B1 | | 7/2001 | Howard |
| 6,655,710 B2 | | 12/2003 | Lindell et al. .............. 280/419 |

* cited by examiner

Primary Examiner—Jeffrey Hofsass
Assistant Examiner—Eric Blount
(74) Attorney, Agent, or Firm—Kathryn A. Marra

(57) ABSTRACT

This invention provides a system to detect in real time the condition of jackknifing tendency during vehicle-trailer backing up, and to provide steering direction assistance. The system utilizes rates of change of a vehicle-trailer articulation angle to determine a critical articulation angle.

18 Claims, 2 Drawing Sheets

VEHICLE-TRAILER BACKING UP JACKKNIFE DETECTION AND WARNING SYSTEM

FIELD OF THE INVENTION

The present invention relates to a vehicle trailer hitch and more particularly to a vehicle hitch system which can detect a jackknife condition and warn the vehicle operator.

BACKGROUND OF THE INVENTION

It is well known that backing up a vehicle with a trailer for many drivers is often difficult and frustrating. Even individuals with considerable driving experience often have little opportunity to develop the skill required to back up a trailer. Much of the difficulty associated with backing up a trailer results from the fact that it is not intuitive for many drivers to sense the jackknifing situation before it is too late a nd from the fact that many drivers do not know how to steer properly in order to align the trailer back to avoid a jackknifing situation. It is the purpose of this invention to provide such assistance to the driver by the early detection of vehicle-trailer jackknifing tendency and provide steering direction assistance to avoid a jackknifing situation.

In general, vehicle-trailer backing up is by nature an unstable motion, unless an experienced driver in the loop stabilizes it with timely and proper steering and/or braking. Jackknife occurs when a vehicle-trailer is approaching away from its equilibrium position, a position intended by the driver through his/her steering input, and thus becomes unstable. In other words, the relative angle between vehicle and trailer is diverging from the driver's intended target angle, and usually increases if proper steering and/or braking action are not taken. This is typically out of control by the driver, either due to lack of sufficient driving skill, or the condition is too severe. Therefore, a driver's capability in controlling the motion of vehicle-trailer combination is one of the key elements in this invention.

The prior art can be found through U.S. Pat. No. 6,268, 800 and U.S. Pat. No. 5,912,626 related to this invention. Both of these systems use hitch articulation position as the sole criteria to detect a potential jackknifing situation. While systems provide satisfactory functioning for a vehicle towing a trailer, they may not function during the backing up of a trailer. More particularly, neither of them takes into account the operator and vehicle-trailer combination into consideration. Furthermore the articulation rate (as how fast the jackknife is to happen) during the detection of jackknife situation is not used in their calculations.

SUMMARY OF THE INVENTION

The jackknifing warning system of the present invention utilizes vehicle steering wheel angle sensor signal, vehicle travel speed and hitch articulation angle to evaluate system stability. Based on a hitch angle equilibrium position, hitch angle rate and some predetermined criteria, the system utilizes an algorithm to determine if the motion of vehicle-trailer combination is stable or not with driver in the loop. When instability is detected, a critical hitch angle will be calculated as a function of hitch angle rate, a predetermined maximum critical hitch angle and a predetermined tolerant time period to determine if and how the vehicle-trailer is approaching jackknifing. If the vehicle-trailer surpasses the critical angle, a proper warning signal is issued with varying intensity as the severity varies. The algorithm also provides steering direction assistance in order for the driver to steer to avoid jackknifing.

This invention can apply to vehicle with either two-wheel steer or four-wheel steer with a trailer. Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
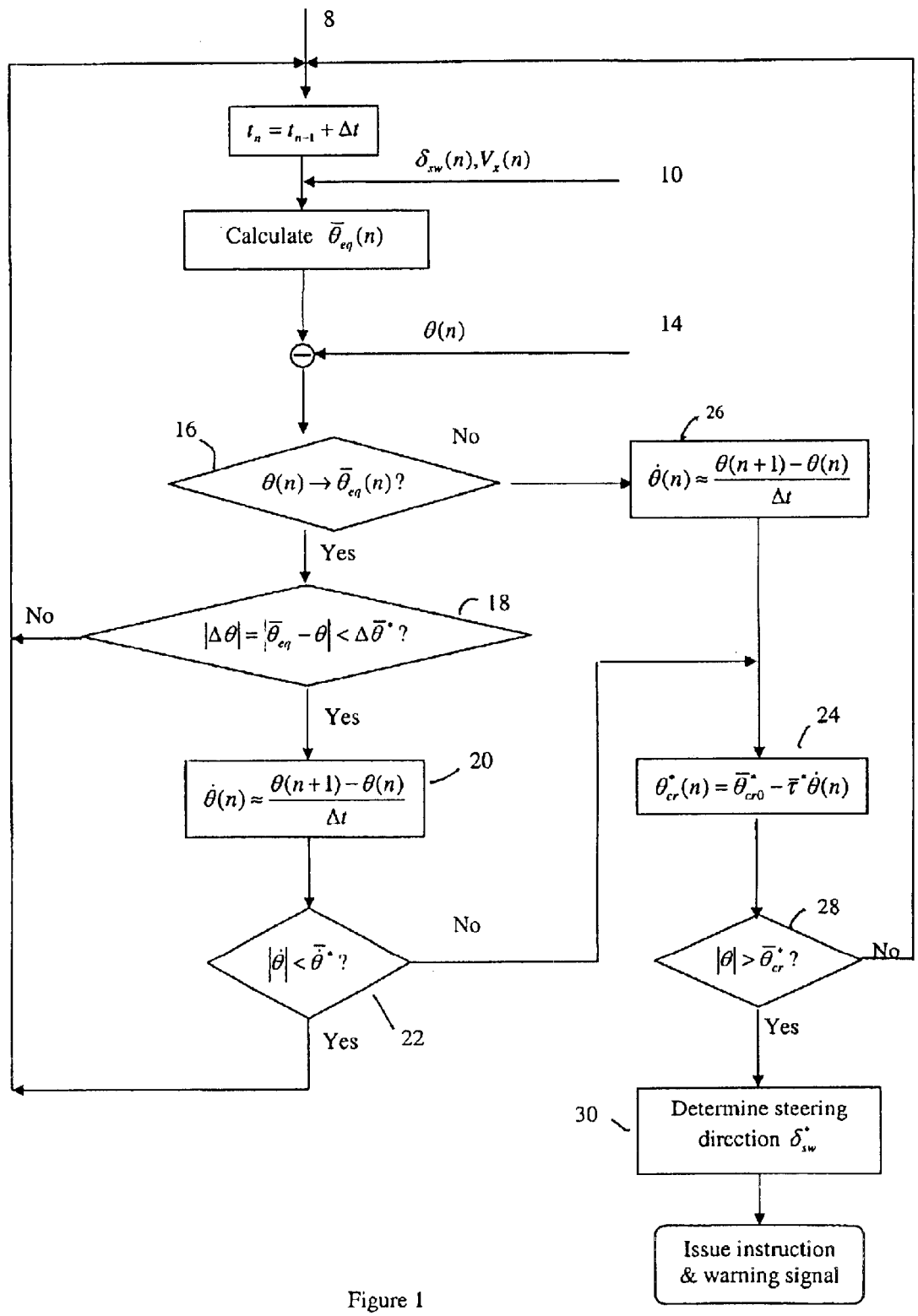
FIG. 1 depicts an algorithm to determine a potential jackknife situation during back-up of a vehicle-trailer.

With reference to FIG. 1, the system according to the present invention first determines the instability of the vehicle and trailer with driver in the loop. For example, whether or not the vehicle-trailer combination is under control. After updating a system clock, the system begins when a controller reads steering wheel angle $\delta_{sw}$ from steering wheel angle sensor and vehicle traveling speed from speed sensor at input point 10. In order to detect system instability, at process block 12 an equilibrium position in terms of hitch angle is calculated based on the input of vehicle steering wheel angle, vehicle speed along with some geometric parameters of the vehicle and trailer. The equilibrium position of the hitch angle, $\bar{\theta}_{eq}$, can be calculated as below:

$$\bar{\theta}_{eq} = \tan^{-1}\left(\frac{y}{x}\right) = f(\delta_f \delta_r, \Gamma), \tag{1}$$

Where $$\delta_f = \frac{\delta_{sw}}{r_{gearRatio}}$$

is the front-wheel angle, and $\delta_r = K_f \delta_{sw}$ is the rear-wheel angle if four-wheel steer vehicle. $r_{gearRatio}$ is the gear ratio in front steering system while $K_f$ is the ratio between steering wheel to rear-wheel angle for four-wheel steer vehicle. $\Gamma$ represents the geometric parameters of vehicle-trailer combination where $$x = h - \frac{L_1 \tan\delta_r}{\tan\delta_f - \tan\delta_r}$$

$$y = \frac{YL_2 x}{Y^2 - x^2} + \frac{x^2}{Y^2 - x^2}\sqrt{Y^2 + L_2^2 - x^2}, \text{ and}$$

$$Y = \sqrt{\left(\frac{L_1}{\tan\delta_f - \tan\delta_r} + \frac{T}{2}\right)^2 + \left(h - \frac{L_1 \tan\delta_r}{\tan\delta_f - \tan\delta_r}\right)^2 - L_2^2}$$

A measured hitch angle is taken at input block 14. The measured hitch angle is then compared with the equilibrium position in terms of hitch angle at query block 16 based on criteria (2) to determine if the measured hitch angle is approaching to the equilibrium position:

$$\text{if } \theta(n) > \bar{\theta}_{eq}(n) \text{ then} \tag{2}$$

$$\Delta\theta(n) = \theta(n+1) - \theta(n) < 0$$

else $$\Delta\theta(n) = \theta(n+1) - \theta(n) > 0$$

If the criteria (2) are not met, the measured hitch angle is diverging from the equilibrium position, therefore, the instability is detected. Then the hitch angle rate is estimated at block 26 and then proceeds to block 24. Otherwise, it proceeds to query block 18 below.

If the criteria (2) are met in query block 16, the difference $|\Delta\theta(n)| = |\bar{\theta}_{eq}(n) - \theta(n)|$ between the current hitch angle $\theta$ (through hitch angle sensor) and $\bar{\theta}_{eq}$ is calculated in query block 18 and checked to see if it is bounded to a small value. If it is bounded, then the hitch angle rate is estimated at block 20 and checked to see if it is approaching to zero (or bounded to a small value numerically) at the neighborhood of the equilibrium position based on the criteria (3), for early distinction between convergence and divergence of hitch angle towards the equilibrium position:

$$|\Delta\theta(n)| = |\bar{\theta}_{eq}(n) - \theta(n)| < \Delta\bar{\theta}^*(n) \tag{3}$$

$$|\dot{\theta}(n)| < +\dot{e}, \text{ov}\bar{s} \ \dot{\theta} + ee \ *(n)$$

Therefore, if both criteria (2) and (3) are met, the current hitch angle $\theta$ is determined to approach the equilibrium angle, and the stability of vehicle-trailer with drive in the loop can be determined. If $\Delta\theta$ is not bounded at query block 18, it restarts at point 8 with time clock updated. If $\dot{\theta}$ is not bounded at query block 22, the instability is detected. It proceeds to block 24 to calculate the critical hitch angle.

When the instability is detected, the system will check the current vehicle and trailer relative position and compare with a predetermined critical angle under the current estimated hitch angle rate based on equation (4). If the measured hitch angle is larger than the critical angle, the jackknifing status is detected and a warning message is issued and transmitted to the driver via some audio and/or video signals.

$$\dot{\theta}(n) \approx \frac{\theta(n+1) - \theta(n)}{\Delta t} \tag{4}$$

The critical hitch angle can vary depending on the hitch angle rate, as the larger of hitch angle rate, the smaller critical angle can be tolerated. As shown in query block 22, if a is bounded by a small value (or approaching to zero), the system is stable and returns to start point 8. If the condition of query block 22 is not met, the system continues with process block 24. Similarly from query block 16, should the current hitch angle θ not approach the equilibrium angle, the hitch angle rate is estimated approximately in process block 26 based on equation (4).

Given a predetermined maximum critical hitch angle $\bar{\theta}_{cr0}$ at static (hitch angle rate equals to zero), and the predetermined tolerant time period, $\bar{\tau}^*$, to achieve the consistent tolerable time period, the critical hitch angle $\theta_{cr}^*(n)$ at hitch angle rate $\dot{\theta}(n)$ can be determined in process block 24 as:

$$\theta_{cr}^*(n) = \bar{\theta}_{cr0}^* - \bar{\tau}^* \cdot \dot{\theta}(n) \tag{5}$$

If in query block 28 the current hitch angle is smaller than the critical hitch angle, then the system is not seen as a jackknife situation and restarts at start point 8. If in query block 28 the current hitch angle is larger than the critical hitch angle, the vehicle-trailer motion is considered to be approaching to a jackknife situation:

$$|\theta(n)| > \bar{\theta}_{cr}^*(n) \tag{6}$$

The difference $\Delta\theta(n) = |\theta(n)| - \bar{\theta}_{cr}^*(n)$ can be used to determine how severe the potential jackknife situation is. An intensity-varying audio device, such as frequency-varying audio (beep) signal generator, for instance, can be used to generate a signal with lower frequency corresponding to a less severe situation, and higher frequency when the jackknife situation is worse.

Furthermore, when a potential jackknife situation is detected, the system will instruct the driver, based on the current hitch position, as to which direction to steer with maximum steering amount at the fastest steering rate in order to avoid the jackknife. In process block 30, the steering command $\delta_{sw}$ can be determined by:

$$\text{if } \theta(n) > 0, \text{ then} \tag{7}$$

$$\delta_{sw}^* < 0 \text{ (steering right)}$$

else $$\delta_{sw}^* > 0 \text{ (steering left)}$$

Where positive steering means steering left in this invention. With the same device, such information can be passed to the driver through left or right speaker equipped respectively in the original vehicle audio system, or can use light emitting devices. It is envisioned either the amplitude or frequency of the audible signal can be adjusted to alert the operator.

Figure 2:
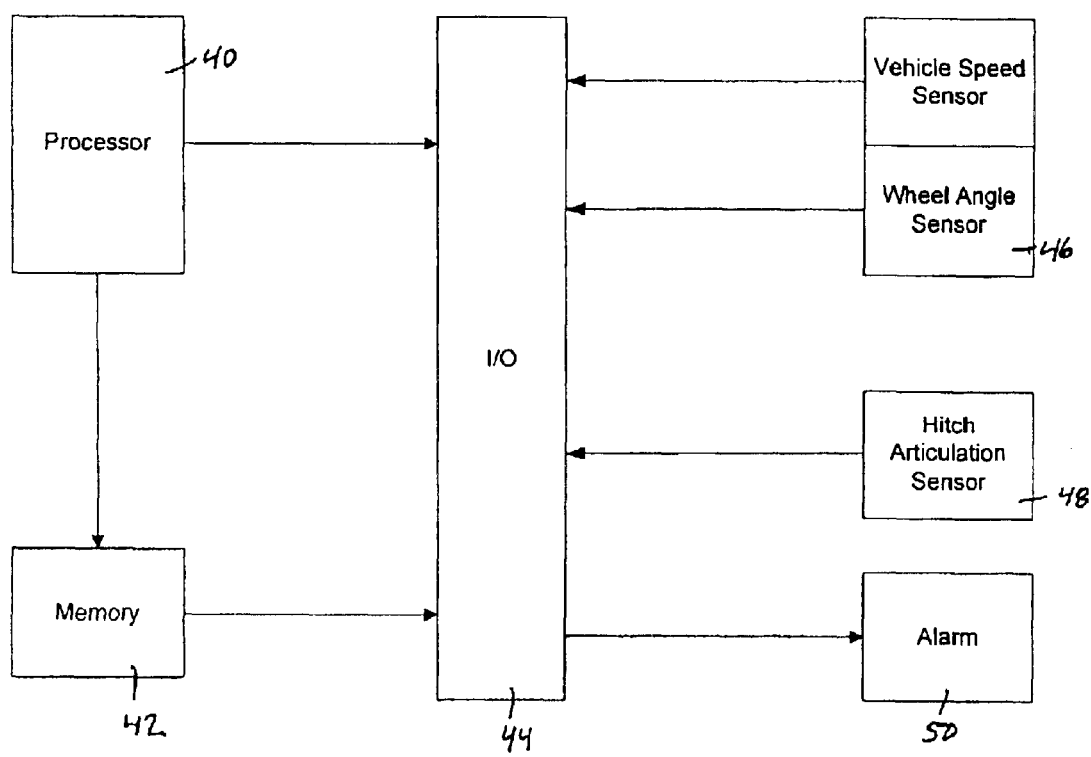
FIG. 2 shows a schematic of a vehicle-trailer system.

FIG. 2 represent a schematic of the system according to the teachings of the present invention. Shown is a controller 40 coupled to an associated memory unit 42. The controller 40 is coupled to a system I/O module 44 which is configured to accept signals from a number of wheel angle and vehicle traveling speed sensors 46 as well as a hitch articulation sensor 48. The I/O module 44 is coupled to an occupant warning system 50 which can take the form of an audible, visual or tactile information system. The warning system FIG. 50 is configured to convey to the vehicle's operator if a jackknife condition exists and further recommend to the vehicle's operator how to avoid a jackknife condition. The detail procedure can be described as follows:

1. The controller 40 reads the sensor signals of vehicle speed, vehicle steering wheel angle $\delta_{sw}$, and calculates the front wheel angle $$\delta_f(n) = \frac{\delta_{sw}}{r_{gearRatio}}$$

and rear wheel angle $\delta_r(n) = K_r \delta_{sw}(n)$ if any.

2. The controller 40 then calculates the hitch angle equilibrium position $\bar{\theta}_{eq}(n)$ based on equation (1);
3. The I/O module 44 reads the sensor signal of hitch angle $\theta(n)$ and the controller 40 compares it with $\bar{\theta}_{eq}(n)$;
4. The controller 40 then determines if $\theta(n)$ is approaching to equilibrium position $\bar{\theta}_{eq}(n)$ based on the criteria (2);
5. If $\theta(n)$ is not approaching to $\bar{\theta}_{eq}(n)$ the vehicle-trailer motion is considered to be unstable. Then, the controller 40 goes to step 7;
6. If $\theta(n)$ is approaching to $\bar{\theta}_{eq}(n)$ further determine if hitch angle and hitch angle rate are bounded from block 18, 20 and 22 based on the criteria (3). If yes, the vehicle-trailer motion is considered to be stable. The controller 46 starts detection over again by going back to step 1;

7. When instability is detected, the critical hitch angle is then calculated based on equation (5) by the controller 40, which is a function of the current hitch angle rate, a predetermined maximum critical hitch angle and a predetermined tolerant time period;

8. If the controller 40 determines that the current hitch angle is larger than the critical hitch angle, the vehicle-trailer motion is considered to be approaching the jackknifing situation;

9. The controller 40 uses the difference $\Delta\theta=|\theta(n)|-\theta_{cr}{}^*(n)$ to determine the severity of the potential jackknife situation. A different audio signal is generated accordingly; and 10. The steering instruction $\delta_{sw}{}^*$ as how to steer to avoid the jackknife is determined based on criteria (7), and passed to the driver accordingly through either right or left speaker 50, for instance.

The system assumes that the roll and pitch of the vehicle and trailer is small and can be neglected; furthermore, the system assumes that the tire slip is negligible. It is envisioned that the above parameters can be modified to incorporate the vehicle and trailer pitch and is well as tire slip should this information become available through systems such as traction control or and anti-lock braking systems.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of determining if a jackknife condition exists in a vehicle having a trailer comprising:
   determining an angle of at least one vehicle steering wheel;
   calculating a hitch equilibrium position;
   determining a hitch angle;
   comparing the hitch angle to the hitch equilibrium position;
   determining if the hitch angle is approaching the hitch equilibrium position; and
   if the hitch angle is not approaching the hitch equilibrium position, then estimate a hitch angle rate, calculate a critical hitch angle as a function of the hitch angle rate, a predetermined maximum critical hitch angle and a predetermined tolerant time period, if the hitch angle is larger than the critical hitch angle, then generate an alarm.

2. The method according to claim 1 wherein determining the angle of the vehicle steering wheel is reading sensor signal from at least one steering system sensor.

3. The method according to claim 1 wherein calculating the hitch equilibrium position is calculating the hitch equilibrium angle as a function of geometric parameters of the vehicle-trailer combination, vehicle speed and vehicle steerable wheel angles.

4. The method according to claim 1 wherein determining a hitch angle is reading the output of a hitch angle sensor.

5. The method according to claim 1 further comprising calculating the difference between the hitch angle and critical hitch angle to determine the severity of the jackknifing situation.

6. The method according to claim 5 further comprising generating an audible signal with an amplitude which is a function of the difference between the hitch angle and critical hitch angle.

7. The jackknife warning system for a vehicle coupled to a trailer with a trailer hitch, the system comprising:
   a hitch articulation angle sensor configured to measure an articulation angle between the vehicle and the trailer;
   a processor configured to receive signals indicative of a vehicle wheel angle, vehicle travel speed and hitch articulation angle;
   wherein the processor is configured to calculate an equilibrium angle, hitch angle rate and a critical hitch angle, the processor is further configured to determine if the hitch articulation angle is approaching the hitch equilibrium angle; if the processor determines the hitch articulation angle is not approaching the hitch equilibrium position, the processor is configured to calculate a critical angle as a function of hitch angle rate, the processor is further configured to compare the critical hitch angle to the articulation angle, if the processor determines the articulation angle is larger then the critical hitch angle, the processor is configured to issue a proper warning signal.

8. The jackknife warning system according to claim 7 wherein the processor is configured to calculate the hitch equilibrium angle as a function of vehicle-trailer geometry, steerable wheel angles and vehicle traveling speed.

9. The jackknife warning system according to claim 7 further comprising a vehicle wheel angle sensor, and wherein the processor is configured to calculate the hitch equilibrium position as a function of signals produced by the vehicle wheel angle sensor, and vehicle traveling speed sensor.

10. The jackknife warning system according to claim 7 wherein the processor is configured to calculate the severity of the potential jackknife situation by comparing the difference between the hitch articulation angle and the critical hitch angle.

11. The jackknife warning system according to claim 10 wherein the processor is configured to generate an audio signal which changes its frequency as a function of the difference between the hitch articulation angle and the critical hitch angle.

12. The jackknife warning system according to claim 10 wherein the processor is configured to generate a signal which directs an operator in how to steer to avoid a jackknife condition.

13. The jackknife warning system according to claim 10 wherein the processor is configured to generate a signal which directs an operator in how to steer to avoid a jackknife condition by emitting an audio sound to one of a left or right vehicle speaker.

14. The jackknife warning system for a vehicle coupled to a trailer with a trailer hitch, the system comprising:
   a wheel angle sensor;
   a hitch articulation angle sensor configured to measure an articulation angle between the vehicle and the trailer;
   a vehicle speed sensor;
   a processor configured to receive signals indicative of a vehicle wheel angle from the wheel angle sensor, vehicle travel speed and hitch articulation angle; and
   wherein the processor is configured to calculate an equilibrium angle as a function of the vehicle wheel angle (s), hitch angle rate and a critical hitch angle as a function of the hitch angle rate, a predetermined maximum critical hitch angle and a predetermined tolerant time period, the processor is further configured to determine if the hitch articulation angle is converging to the hitch equilibrium angle; if the processor determines the hitch articulation angle is not converging on the equilibrium position, the processor is configured to calculate a critical hitch angle as a function of hitch angle rate, the processor is then configured to estimate the hitch angle rate and compare the critical hitch angle to the articulation angle, if the processor determines the articulation angle is larger than the critical hitch angle, the processor is configured to issue a warning signal, if the, processor determines the articulation angle is smaller than the critical hitch angle, the processor is configured to receive a second signal from the hitch angle sensor.

15. The jackknife warning system according to claim 14 wherein the processor is configured to calculate the severity of a potential jackknife situation by comparing a difference between the hitch articulation angle and the critical hitch angle angle.

16. The jackknife warning system according to claim 15 wherein the processor is configured to generate a signal which directs an operator in how to steer to avoid a jackknife condition by emitting an audio sound to one of a left or right vehicle speaker.

17. The jackknife warning system according to claim 15 wherein the processor is configured to generate a signal which directs an operator in how to steer to avoid a jackknife condition.

18. The jackknife warning system according to claim 10 wherein the processor is configured to generate a signal which directs an operator in how to steer to avoid a jackknife condition by emitting an visual signal to one of a left or right light emitting device.

* * * * *